March 27, 1951  J. E. DE REMER  2,546,153
RETRACTABLE AIR INLET SCREEN
FOR AIRCRAFT GAS TURBINES Filed April 19, 1949  3 Sheets-Sheet 1

INVENTOR.
JAMES E. DE REMER
BY Wade Koontz AND
ATTORNEY
Charles L. Burgoyne,
AGENT

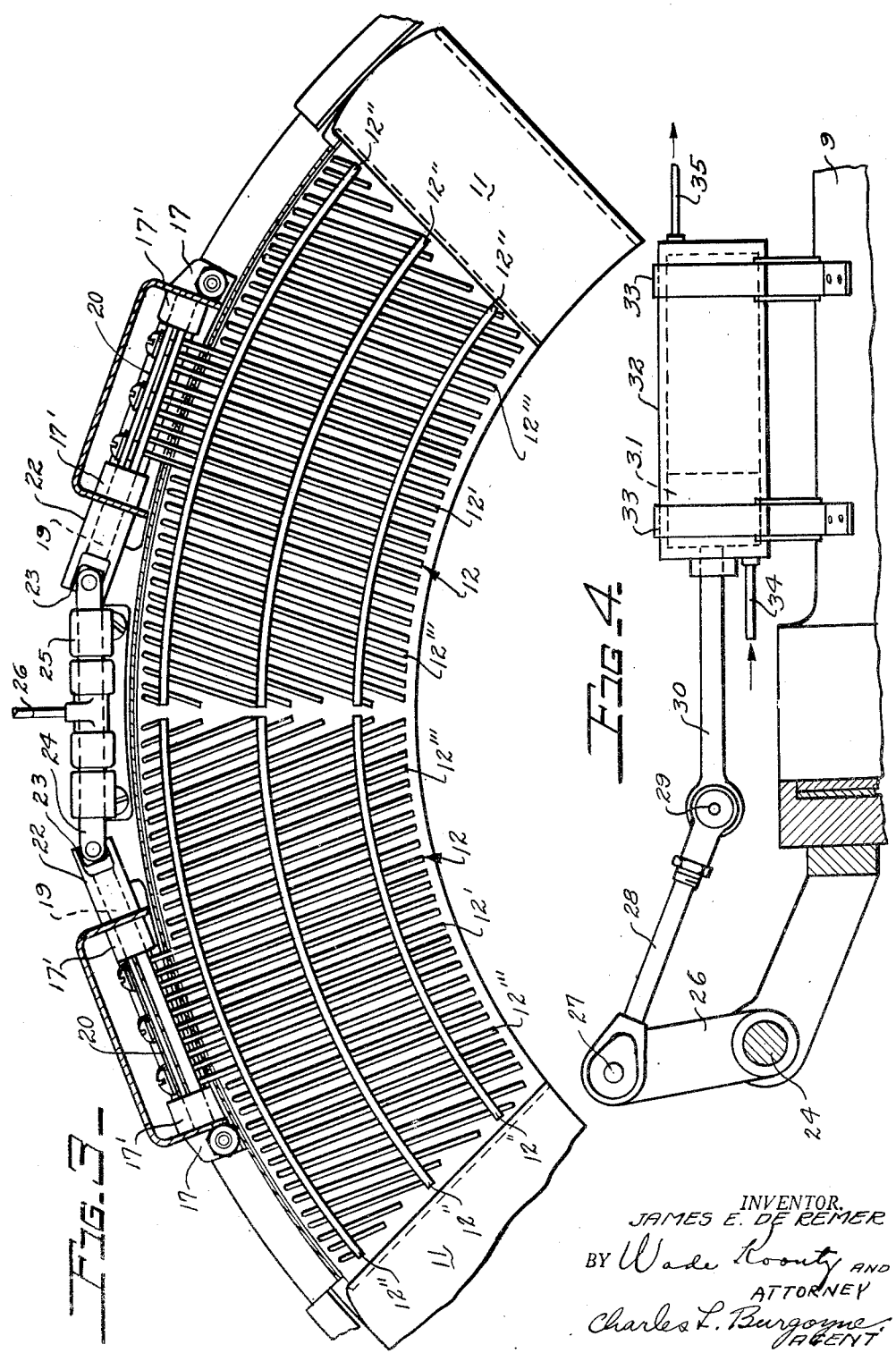

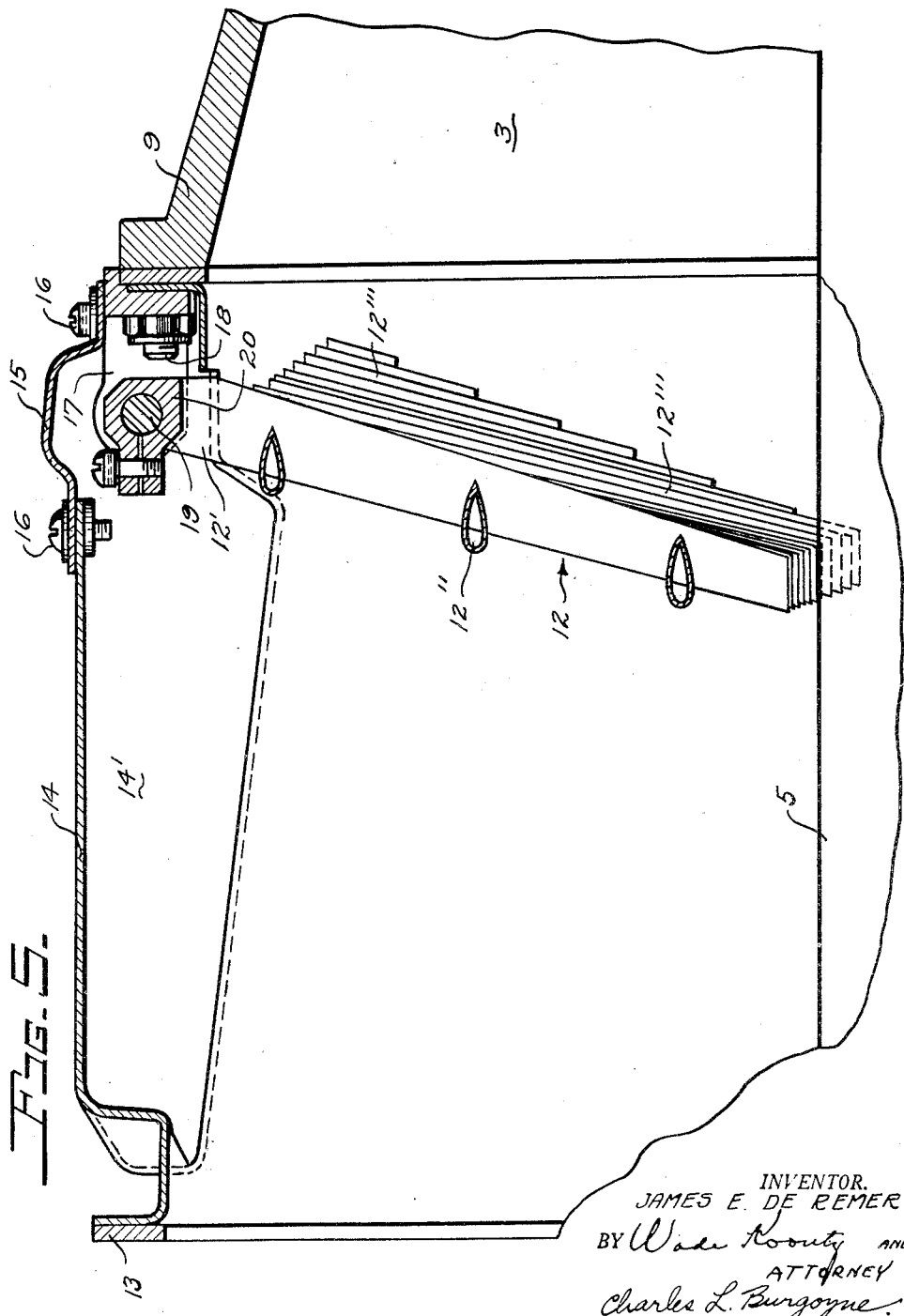

Patented Mar. 27, 1951

2,546,153

UNITED STATES PATENT OFFICE 2,546,153

RETRACTABLE AIR INLET SCREEN FOR AIRCRAFT GAS TURBINES

James E. De Remer, Yellow Springs, Ohio

Application April 19, 1949, Serial No. 88,473

7 Claims. (Cl. 183—62)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a retractable air inlet screen for aircraft gas turbines.

The primary object of the invention is to provide an air inlet screen to be placed ahead of the compressor inlet of a gas turbine and arrange the screen in a manner so that it may be retracted when and if the screen becomes clogged with ice formations.

A further object of the invention is to provide an air inlet screen for aircraft gas turbines and to employ a series of screen elements arranged to fill an annular air inlet passage when in the extended position and to be received in shallow recesses in the turbine housing wall when in the retracted position.

Another object of the invention is to provide a plurality of pivotally mounted air inlet screens for use in an aircraft gas turbine or turbojet engine and to provide motor actuators for said screens so that in case the screens are subject to icing conditions they may be retracted to allow the free flow of air to the engine.

The above and other objects of the invention will become apparent upon reading the following detailed description of the invention in conjunction with the accompanying drawings, in which:

Fig. 3 is a view of two inlet screen elements in active position over the corresponding air inlet passage of the engine.

Fig. 4 is a schematic view of one possible form of screen actuator.

Fig. 5 is an enlarged cross sectional view of one inlet screen element and the surrounding structure.

In turbojet engines for aircraft it is customary to provide in the air inlet passages some kind of screens or gratings to hold back loose debris which may be sucked into the air compressor at the forward end of the engine, thus avoiding damage to the compressor blades as well as other parts of the engine. Most of the loose objects are picked up during ground runs but in combat flight there may be battle debris due to disintegrating aircraft and in any flight it is possible to intercept birds on the wing. The air inlet screens being at the forward end of the aircraft and receiving large quantities of atmospheric air, are subject to icing under appropriate conditions and if the ice develops to any great extent the air flow through the screen may be reduced to a point where the engine loses power or may even stall completely. To avoid icing of the screens during flight it is proposed in the present invention to retract the screens away from the air inlet passages when icing conditions prevail. At the same time this retraction will reduce the pressure drop through the air inlet passages and increase the inlet pressure at the air compressor. Thus even though there is little or no ice on the screen it may be retracted at any time to give this reduced pressure drop with some increase in power, due to the increased air pressure available to the engine.

Figure 1:
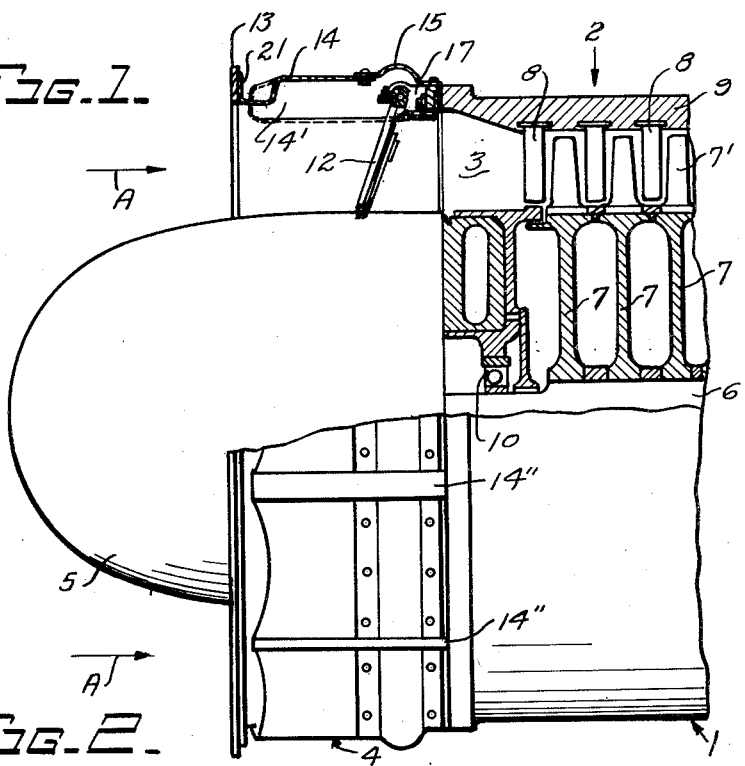
Fig. 1 is an elevation view partly in cross section of the forward end portion of a turbojet engine.

The particular structural arrangement of elements which makes possible the retraction of the screen elements will now be described by reference to the drawings. In Fig. 1 there is shown the forward or inlet end of a turbojet engine 1 including three stages of the air compressor 2, the annular air inlet passage 3, the cylindrical screen section 4 and the enclosed accessory section 5. The remainder of the engine to the right of Fig. 1 will of course conform to some standard construction, such as that shown in Fig. 1 (page 238) of "Gas Turbine Construction" (1947) by R. Tom Sawyer. As is well known the air is first compressed, then used to support combustion in a group of combustion chambers and the hot gases are then used to drive a small gas turbine and to pass from the engine as a jet of hot gases. Power from the turbine is used to drive the compressor by means of a central shaft, as indicated at 6 in Fig. 1. Since the rapid flow and expansion of gases in the engine provides propulsive thrust for the aircraft, the engine of Fig. 1 may be considered as moving rapidly to the left with the air entering in the direction of arrows A. The central shaft 6 carries a series of compressor disks or wheels 7 having blades 7' thereon, the latter blades cooperating with fixed blades 8 to compress the incoming air. The fixed blades 8 are secured to the inner side of the engine casing 9. One of the bearings for rotatably supporting the central shaft is indicated at 10. Various necessary engine accessories are enclosed within the dome-like housing 5 fixed to the engine, and particularly to the central portion thereof which is usually termed the island. The island is supported from the engine casing 9 by four struts 11 through which pass certain conduits and control lines. The incoming air must pass around the struts 11 which are of streamlined cross section. The arcuate spaces between the struts 11 receive the screen elements 12, which are eight in number in the preferred form of the invention. These elements are arranged in pairs, as best seen in Fig. 3.

Figure 2:
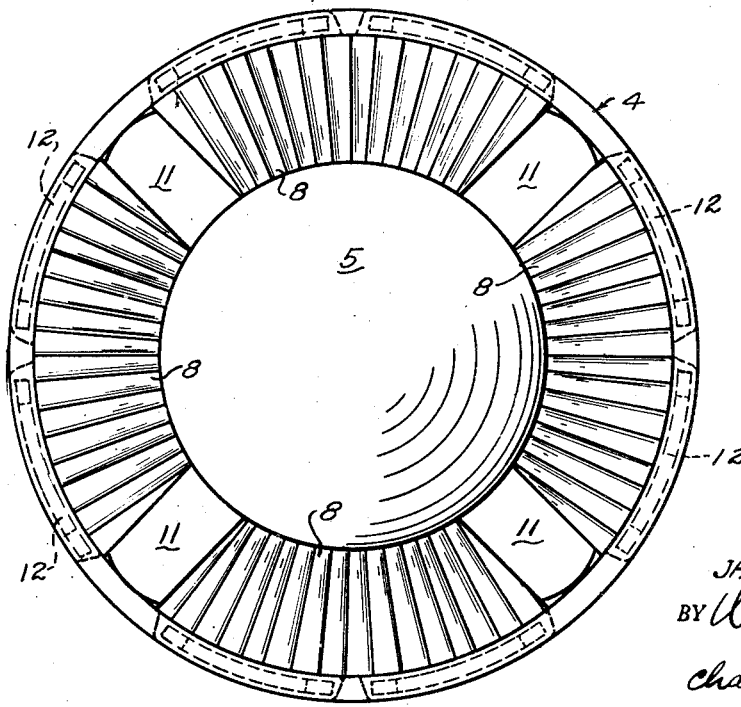
Fig. 2 is a front view of the engine but with the inlet screen elements in retracted position.

The screen section 4 of the engine comprises a ring-like outer structure including the forward flange member 13, housing member 14 and access ring 15. The three main ring members are attached to each other in any desired manner but as seen in Figs. 1 and 5 it is preferred to attach the access ring 15 by means of screws 16 for ease in removal. The rearward edge of the ring 15 is supported on and attached to a plurality of screen supporting brackets 17 which are in turn attached by bolts 18 to the engine casing 9. Rotatably supported between pairs of bearing lugs 17' on the brackets 17 are shafts 19 having knuckle members 20 adjustably clamped thereon. Each knuckle member 20 carries a portion of the screen 12 in the form of radially extending bars 12'. These bars are integrally connected to the arcuate bars 12'' which also carry a multiplicity of radial bars 12''' to complete the screen elements. The bars 12'' are not only curved about the central axis of the engine, as seen in Fig. 3, but are also curved forwardly in order to conform to the curvature of the housing member 14 when the screens are fully retracted, as shown in Fig. 2. This second curvature means that the screen elements 12 will be better able to withstand shocks from debris striking thereagainst when the screens are fully extended, as in Figs. 1 and 5. In this projected or extended position the radial bars of the screens are in a relative position as shown in Fig. 1, which is about 70 degrees away from the retracted position. As best seen in Figs. 1, 2 and 5 the housing member 14 encircling the screen section 4 is formed with a series of recesses 14' within which the screen elements 12 are received when fully retracted. Between the recesses 14' the member 14 is indented inwardly, as at 14'', the complete ring-like structure being thus made more rigid. It will be noted in Fig. 1 that one indentation 14'' is wider than the other but the wider one merely shows that two adjacent screen sections separated by a strut 11 are spaced farther apart than two sections which are not so separated, as for instance the pair of sections 12 of Fig. 3. The lower edges of the screen elements 12 being curved, as seen in Fig. 3, the recesses 14' are similarly curved along their forward edges, as seen in Fig. 1. The forward end of the screen housing member 14 is provided with a continuous flange 21 which serves as an attaching means for the ring 13 and also helps to stiffen the member 14. The flange 21 and ring 13 are secured together by welding, riveting or even by bolts if desired.

For an explanation of one possible screen actuating means, reference is made to Figs. 3 and 4. The rotatable shafts 19 have their adjacent ends projecting outwardly in a tangential direction and each carries a sleeve 22 forming one element of a universal joint. The outer end of each sleeve 22 is cut out to receive a swivel element 23 also connected to the adjacent end of a power shaft 24. The shaft 24 is mounted to turn in bearings 25 and centrally thereof carries a rigid arm 26. Pivoted to the arm or crank 26, as at 27, there is an adjustable link or pitman 28 pivotally connected at 29 to a piston rod 30. The rod 30 carries a piston 31 slidable within a closed hydraulic cylinder 32. The cylinder 32, mounted on the engine casing 9 by straps 33, is provided with fluid connecting tubes 34 and 35 to admit hydraulic actuating medium to the cylinder. If fluid is admitted in the direction of the arrows the piston 31 will be moved to the right thus rotating the power shaft 24 to rotate the screen elements 12 of Fig. 3 into a retracted position through an angle of about 70 degrees. Limit stops of any desired type may be used to limit movement of the screen elements through a desired range or angle. The actuating crank arm 26 for each of the four pairs of screen elements 12, 12 extends through a narrow slot in the access member 15. It is of course understood that a servomotor may be used for each pair of screen elements as explained above, or all power shafts 24 and drive shafts 19 may be made to operate through a single servomotor by providing flexible shaft connections or swivel connections between the shafts clear around the engine. The hydraulic cylinder 32 is effective to operate the associated screen elements in either direction by merely reversing the direction of fluid flow to the cylinder. It is also to be understood that various types of servomotors may be used as desired, without departing from the general principles of the invention. While the illustrated arrangement of screen elements is preferred, it is understood that the number and shape of the screen elements may be varied according to the individual installation or choice. In the present arrangement the screen elements are made generally arcuate in plan and also in transverse cross section. Thus the series of screen elements will properly cover an annular air passage and the screen elements when retracted will fit nicely into the pockets or recesses 14'. Furthermore the transverse arching of the screen elements make them resistant to the stresses incurred in being struck by hard objects entering the air inlet passage.

The inherent ability of the movable screen elements to keep foreign bodies and debris out of the air passages rearwardly of the screen elements is worthy of mention and further explanation. Considering the screen elements in the closed or screening position it is noted that the screen elements can not be swung inwardly if struck by a substantial object, since the inner free ends of the screen elements are in contact with the outer surface of the island housing 5 at points forwardly of a transverse plane containing all the shafts 19. This relation of the parts also means that hard objects upon striking the screen elements will tend to be forced toward the hinge axes because of the steadily applied force of incoming air. This action is desirable for the reason that when the screen elements are retracted the objects caught thereon will not enter the air passages by way of spaces between the inner ends of the elements and the housing 5. Of course it is also clear that as the screen elements move away from the closed or projected position, the angularity with respect to the incoming air increases so that the force of incoming air applied to clinging objects tends still more to force such objects toward the hinge axes. The net result of the forward and outward sweeping action of the screen elements as they move from projected to retracted position is to cause foreign bodies and debris to be caught between the screen elements and the walls of recesses 14', especially in the regions adjacent to the hinge axes. Then when the screens are again moved to the projected or closed position most, if not all, of the foreign bodies will stay on the screen elements in the regions adjacent to the hinge axes thereof.

It should be understood that the collected debris falls into three main classes as follows:

(1) Hard rounded objects such as stones, bolts and cartridge cases.
(2) Hard elongated objects such as sheet metal, wire and nails.
(3) Soft articles of extensive surface area such as rags, leaves and birds.

The present retractable screen elements fend off all of the above kinds of debris very effectively although each kind is different in its effect and reaction. The hard round objects tend to roll immediately toward the hinge axis and stay there as long as air is flowing in full volume. Hard elongated objects either become enmeshed in the screen elements or gradually work toward the hinge axis under the steady impact of ram air. Soft articles tend to cling to the screen elements in exactly the position which they first take upon striking the screen elements. These latter articles can be troublesome because of the resistance to air flow which they offer but upon retraction of the screen elements this air flow restrictive effect is eliminated. Also as the screen elements near the retracted position even the softer objects are usually swept toward the hinge axes of the screen elements. It is also customary to examine and clean the screen elements after every flight, especially on airplanes operating under adverse conditions.

The ability of the present retractable screen elements to effectively handle and cope with all kinds of debris is due to several factors. The most noteworthy of these factors are: (1) the forwardly arched construction of the separate screen elements each of arcuate or segmental plan affords a maximum degree of impact strength; (2) the positive motion stopping action of the island housing in the closed position of the screen elements which prevents inward rotation of the elements in case there is an impact thereagainst; (3) the obtuse angularity of the screen elements with respect to the incoming air and foreign bodies in the closed position whereby the force reaction tends to cause the bodies to move toward the hinge axes; and (4) the forward and outward swinging movement of the screen elements as they move toward the retracted or open position.

The embodiments of the invention herein shown and described are to be regarded as illustrative only and it is to be understood that the invention is susceptible to variations, modifications and changes within the scope of the appended claims.

I claim:

1. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally arcuate shape in plan to conjointly form a ring-like structure for disposition within said annular air inlet structure in an air screening position intermediate of the ends and transversely of the length of said structure for screening all air passing through said air inlet structure, means at the outer circumferential surface of said air inlet structure for pivotally mounting said screen elements, and remote control means for moving said screen elements about said pivotal mounting means whereby each of said screen elements may be retracted away from the air screening position aforesaid to retracted positions adjacent to and substantially parallel to the outer circumferential surface of said annular air inlet structure.

2. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally arcuate shape in plan to conjointly form a ring-like structure for disposition within said annular air inlet structure in an air screening position intermediate of the ends and transversely of the length of said structure for screning all air passing through said air inlet structure, means at the outer circumferential surface of said air inlet structure for pivotally mounting said screen elements, remote control means for moving said screen elements about said pivotal mounting means whereby each of said screen elements may be retracted away from the air screening position aforesaid, and said screen elements being of arcuate shape in transverse cross section in order to attain retracted positions in which said screen elements are near to and uniformly spaced from the outer circumferential surface of said annular air inlet structure.

3. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally arcuate shape in plan to conjointly form a ring-like structure for disposition within said annular air inlet structure in an air screening position intermediate of the ends and transversely of the length of said structure for screening all air passing through said air inlet structure, each of said screen elements including a plurality of arcuate bars connected by a multiplicity of radial bars, a portion of said radial bars being rigidly connected at their outer ends to a bearing member, means adjacent to the outer circumferential surface of said air inlet structure for pivotally mounting each of said bearing members, and remote control means for moving said screen elements about said pivotal mounting means whereby each of said screen elements may be retracted away from the air screening position aforesaid to retracted positions adjacent to and substantially parallel to the outer circumferential surface of said annular air inlet structure.

4. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally arcuate shape in plan to conjointly form a ring-like structure for disposition within said annular air inlet structure in an air screening position intermediate of the ends and transversely of the length of said structure for screening all air passing through said air inlet structure, each of said screen elements including a plurality of arcuate bars connected by a multiplicity of radial bars, a portion of said radial bars being rigidly connected at their outer ends to a bearing member, means adjacent to the outer circumferential surface of said air inlet structure for pivotally mounting each of said bearing members, remote control means for moving said screen elements about said pivotal mounting means whereby each of said screen elements may be retracted away from the air screening position aforesaid, and said screen elements being of arcuate shape in transverse cross section in order to attain retracted positions in which said screen elements are near to and uniformly spaced from the outer circumferential surface of said annular air inlet structure.

5. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally segmental shape in plan to conjointly form a ring-like structure for disposition within said annular air inlet structure intermediate of the ends and transversely of the length thereof for screening all air passing through said air inlet structure, means near the outer circumferential surface of said annular air inlet structure for pivotally mounting said screen elements for movement in a fore-and-aft direction, means to prevent pivotal movement of said screen elements rearwardly along said air inlet beyond air screening positions wherein said screen elements extend at obtuse angles with respect to the direction of air flow into said annular air inlet, and remote control means for moving said screen elements about said pivotal mounting means whereby each of said screen elements may be retracted away from the air screening positions aforesaid to retracted positions adjacent to and substantially parallel to the outer circumferential surface of said annular air inlet structure.

6. In an aircraft gas turbine assembly including an air compressor to receive atmospheric air entering through an annular air inlet structure at the forward end of the assembly and extending a substantial distance lengthwise of said assembly, a plurality of rigid air inlet screen elements of generally segmental shape in plan to conjointly form a ring-like structure for disposition within said annular air inlet structure intermediate of the ends and transversely of the length thereof for screening all air passing through said air inlet structure, means near the outer circumferential surface of said annular air inlet structure for pivotally mounting said screen elements on axes of rotation parallel to lines tangent to said outer circumferential surface, means to prevent pivotal movement of said screen elements rearwardly along said air inlet beyond air screening positions wherein said screen elements extend at obtuse angles with respect to the direction of air flow into said annular air inlet, and remote control means for moving said screen elements about said pivotal mounting means whereby each of said screen elements may be retracted forwardly and outwardly away from the air screening positions aforesaid to retracted positions adjacent to and substantially parallel to the outer circumferential surface of said annular air inlet structure.

7. In an aircraft gas turbine assembly including an air compressor to receive atmospheric air entering through an annular air inlet structure at the forward end of the assembly, a plurality of rigid air inlet screen elements of generally segmental shape in plan to conjointly form a ring-like screen structure for disposition within said annular air inlet structure in an air screening position transversely of the axial length of said structure for screening all air passing through said air inlet structure, means near the outer circumferential surface of said annular air inlet structure for pivotally mounting said screen elements for pivotal movement in a fore-and-aft direction, and remote control means for moving said screen elements about said pivotal mounting means whereby each of said screen elements may be retracted away from the air screening position aforesaid to retracted positions wherein each of said screen elements is rotated forwardly and outwardly from the air screening positions thereof and adjacent to the outer circumferential surface of said annular air inlet structure when fully retracted.

JAMES E. DE REMER.

REFERENCES CITED

The following references are of record in the file of this patent:

UNITED STATES PATENTS

| Number | Name | Date |
|---|---|---|
| 1,881,058 | Mitchell | Oct. 4, 1932 |